(12) United States Patent
Harres

(10) Patent No.: US 7,095,493 B2
(45) Date of Patent: Aug. 22, 2006

(54) OPTICAL TIME DOMAIN REFLECTOMETER AND METHOD OF USING THE SAME

(75) Inventor: Daniel N. Harres, Belleville, IL (US)

(73) Assignee: The Boeing Company, Chicago, IL (US)

(*) Notice: Subject to any disclaimer, the term of this patent is extended or adjusted under 35 U.S.C. 154(b) by 91 days.

(21) Appl. No.: 10/722,688

(22) Filed: Nov. 24, 2003

(65) Prior Publication Data

US 2005/0110979 A1    May 26, 2005

(51) Int. Cl.
*G01N 21/00* (2006.01)
(52) U.S. Cl. .................................................. 356/73.1
(58) Field of Classification Search .............. 356/73.1; 398/9–38, 154–161; 385/37, 124, 131, 123, 385/24; 250/214 VT, 458.1
See application file for complete search history.

(56) References Cited

U.S. PATENT DOCUMENTS

| | | | | |
|---|---|---|---|---|
| 5,467,942 A | * | 11/1995 | Abbas et al. | 244/75 R |
| 6,614,512 B1 | * | 9/2003 | Sakamoto et al. | 356/73.1 |
| 6,771,361 B1 | * | 8/2004 | Araki et al. | 356/73.1 |

\* cited by examiner

*Primary Examiner*—Tu T. Nguyen
(74) *Attorney, Agent, or Firm*—Thompson Coburn LLP

(57) ABSTRACT

An inexpensive optical time domain reflectometer is disclosed that comprises a variable delay device and that is capable of identifying the location of a damage portion of a fiber optic cable with great accuracy and minimal power consumption. A method of providing a vehicle with an on-board optical time domain reflectometer is also disclosed.

13 Claims, 3 Drawing Sheets

OPTICAL TIME DOMAIN REFLECTOMETER AND METHOD OF USING THE SAME

STATEMENT REGARDING FEDERALLY SPONSORED RESEARCH OR DEVELOPMENT

This invention was made with Government support under N00019-04-0005 awarded by the United States Navy. The Government has rights in this invention.

BACKGROUND OF THE INVENTION (1) Field of the Invention

This invention pertains to optical time domain reflectometers and to the use of such devices in determining the location of damaged portions of fiber optic cables. More particularly, this invention pertains to an inexpensive and simple configuration of an optical time domain reflectometer and the use of such a device as an integral component of a fiber optic system.

(2) Background

It is well known in the field of fiber optics that a damaged portion of a fiber optic cable will reflect at least a portion of the light traveling along the cable, back along the cable in a direction opposite the direction from which such light came. Using this phenomenon, optical time domain reflectometers (OTDR(s)) are able to locate damaged portions of fiber optic cables, at least to within a given range distance relative to known points along such cables. OTDRs typically operate by sending a very short-duration, high-power laser pulse along the optical cable, and by thereafter observing the returned reflections from the pulse. Although portions of the pulse are also reflected back by such things as connectors that are used to join individual sections of a fiber optic cable, by comparing the observed time domain reflection response to the time domain response that would be expected had the cable not been damaged, the portion of the pulse reflected by the damaged portion of the cable can be ascertained. The time delay between the emission of the laser pulse and the detection of its partial reflection back from the damaged portion of the cable can then be utilized to determine how far such light traveled, and hence the distance to the damaged portion.

Although OTDRs have been proven to be very useful, such devices are generally quite expensive due to the fact that they require components that can produce relatively high-power, short-duration laser pulses, and require multiple components that can sample relatively low-amplitude reflections during relatively small time domains with considerable precision. Additionally, such devices typically consume an appreciable amount of power.

SUMMARY OF THE INVENTION

The present invention overcomes the disadvantages associated with prior art OTDRs by providing a configuration of an OTDR that requires only few relatively inexpensive components with low power consumption, yet is capable of detecting extremely low amplitude pulse reflections and can determine the time domain response of such reflections with extreme precision. Furthermore, the low cost and low power consumption of OTDRs configured in accordance with the invention allow for such devices to be utilized as permanent components of optical systems, such as fiber optic control systems of vehicles including aircraft or fiber optic systems of land-based communication networks.

Preferably, an OTDR in accordance with the invention comprises a laser pulse generator, a sample-and-hold device, and a variable delay device. The laser pulse generator is adapted and configured to emit a plurality of laser pulses. The sample-and-hold device is adapted and configured to store information indicative of light intensity reaching a sampling point. The variable delay device is operatively connected to the laser pulse generator and to the sample-and-hold device in a manner such that it can trigger the sample-and-hold device to commence storing information indicative of light intensity reaching the sampling point at a time interval from emission of a laser pulse from the laser pulse generator. The variable delay device is also configured and adapted to adjust the time interval.

A method of practicing the invention comprises, among other things, providing a light conduit that is comprised of at least one fiber optic cable that has at least one damaged portion. The method further comprises providing a sample-and-hold device that is adapted and configured to store information indicative of light intensity reaching a sampling point. Additionally, the method comprises providing a storage device that is operatively connected to the sample-and-hold device in a manner such that information stored by the sample-and-hold device can be transmitted to and stored by the storage device. Furthermore, the method comprises iteratively performing the steps of transmitting a laser pulse, storing a block of information indicative of light intensity reaching the sampling point throughout a period of time via the sample-and-hold device, and storing the block of information via the storage device. These later-mentioned steps are iteratively repeated a number of times. During each iterative step of transmitting a laser pulse, the laser pulse is emitted in a first direction along the light conduit in a manner such that at least a portion of the laser pulse is reflected by the damaged portion of the fiber optic cable back along the light conduit in a direction opposite the first direction and eventually reaches the sampling point. The iterative step of storing the block of information commences the sum of a first period of time and a second period of time from when the portion of the laser pulse is reflected by the damaged portion of the fiber optic cable. The second period of time is equal to the product of X and in incremental time interval, where X is a number that is adjusted after each iteration. The method yet further comprises determining an approximate location of the damaged portion of the fiber optic cable along the light conduit via the information stored by the storage device.

Another method in accordance with the invention comprises providing a vehicle in a manner such that the vehicle has a control system that comprises at least one fiber optic cable and such that the vehicle has an on-board optical time domain reflectometer. The on-board optical time domain reflectometer is operatively connected to the fiber optic cable. The method also comprises using the on-board optical time domain reflectometer to locate an approximate position of a damaged portion of the fiber optic cable to within twelve inches relative to another portion of the vehicle.

While the principle advantages and features of the invention have been described above, a more complete and thorough understanding of the invention may be obtained by referring to the drawings and the detailed description of the preferred embodiment, which follow.

Figure 1:
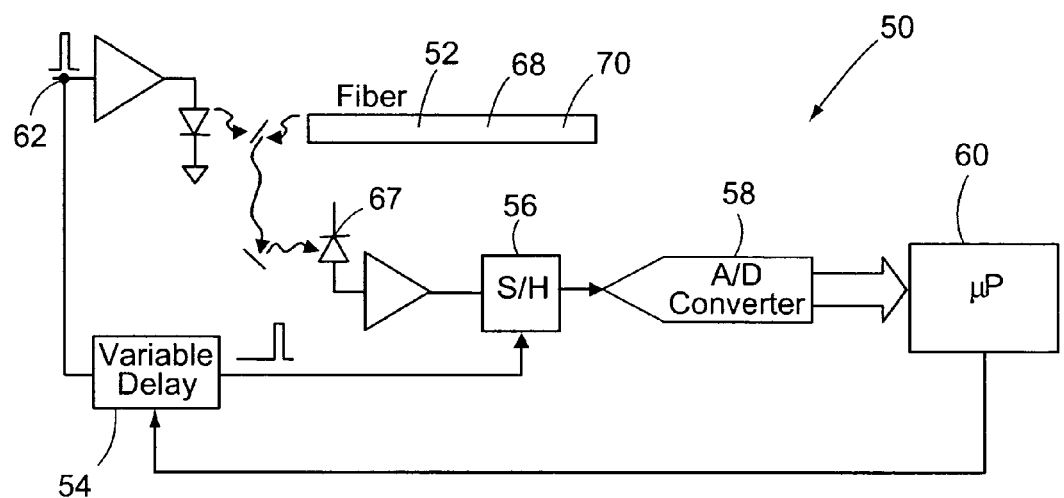
FIG. 1 is a schematic of the preferred embodiment of an OTDR in accordance with the invention.

Reference characters in the written specification indicate corresponding items shown throughout the drawing figures.

DETAILED DESCRIPTION OF THE PREFERRED EMBODIMENT OF THE INVENTION

A schematic of the preferred embodiment of an OTDR in accordance with the invention is shown in FIG. 1 and is generally represented by the numeral 50. As shown in FIG. 1, the OTDR 50 is operatively connected to an optical data transfer assembly 52, and preferably comprises a variable delay device 54, a sample-and-hold device 56, an analog-to-digital converter 58, and a microprocessor 60. The OTDR 50 is also operatively connected to a laser pulse generator 62, which may form a portion of the OTDR or may be part of the optical data transfer assembly 52 to which the OTDR is attached.

Figure 2:
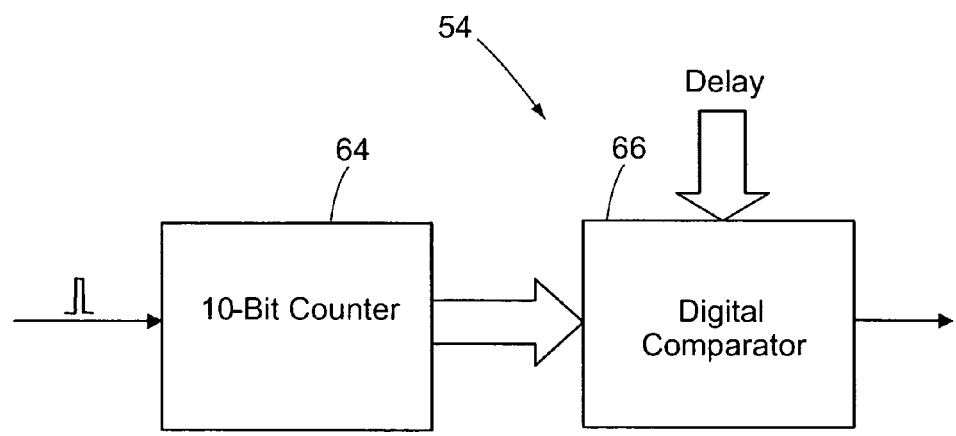
FIG. 2 is a schematic of the preferred embodiment of the variable delay device of the OTDR of FIG. 1.

The variable delay device 54 is operatively connected to the sample-and-hold device 56 and to the microprocessor 60. Additionally, the variable delay device 54 is preferably connected to the optical data transfer assembly 52 or the laser pulse generator 62. In its preferred embodiment, the variable delay device 54 comprises a 10-bit counter 64 and a digital comparator 66, as shown in FIG. 2. The 10-bit counter 64 is operatively connected to the laser pulse generator 62 and is configured to measure the passage of time from when a laser pulse is emitted by the laser pulse generator 62, or from when a laser pulse passes a given point in the optical data transfer assembly 52. The digital comparator 66 is operatively connected to the microprocessor 60, the sample-and-hold device 56, and the 10-bit counter 64 and is configured to trigger the sample-and-hold device to initiate sampling when time measured by the 10-bit counter matches a time delay instruction received from the microprocessor. As such, the variable delay device 54 is configured such that the microprocessor 60 can control the amount of time that passes between when a laser pulse is emitted by the laser pulse generator 62, or from when a laser pulse passes a given point in the optical data transfer assembly 52, and when the sample-and-hold device 56 begins sampling data. Preferably, such time delay can be controlled by the variable delay device 54 to within a small fraction of a nanosecond of a target time delay. It should also be appreciated that various types and configurations of time delay devices are well known and that the time delay device 54 utilized in connection with the OTDR 50 of the preferred embodiment could have any other suitable configuration.

The sample-and-hold device 56 is operatively connected to a sampling point 67 of the optical data transfer assembly 52 in a manner such that data indicative of light intensity reaching the sampling point can be stored by the sample-and-hold device. Preferably, the sample-and-hold device 56 has a capture time of one nanosecond or less. Thus, when triggered by the variable delay device 54, the sample-and-hold device 56 samples and stores data indicative of light intensity reaching the sampling point throughout the following nanosecond.

The analog-to-digital converter 58 is operatively connected to the sample-and-hold device 56 and to the microprocessor 60 and acts to convert and transmit the analog data recorded by sample-and-hold device 56 to the memory of the micro processor 60 in a digital format. No particular speed is required of the analog-to-digital converter 58 and an acquisition time of just a microsecond is suitable.

The optical data transfer assembly 52 to which the OTDR is attached can be any type of optical data transfer assembly, such as an optical control system of an aircraft or an optical land-based communication network. The optical data transfer assembly comprises a light conduit 68 for transmitting data via light. Such a light conduit 68 includes one or more fiber optic cables 70 and may include connectors, air gaps, amplifiers, routers, or other items commonly found in optical data transfer assemblies.

The laser pulse generator 62 is preferably low wattage (approximately one milliwatt or less) and is operatively connected to the light conduit 68 in a manner such that the laser pulse generator 62 can emit laser pulses that travel along the light conduit. As mentioned above, the laser pulse generator 62 is also preferably operatively connected to the variable delay device 54.

Figure 3:
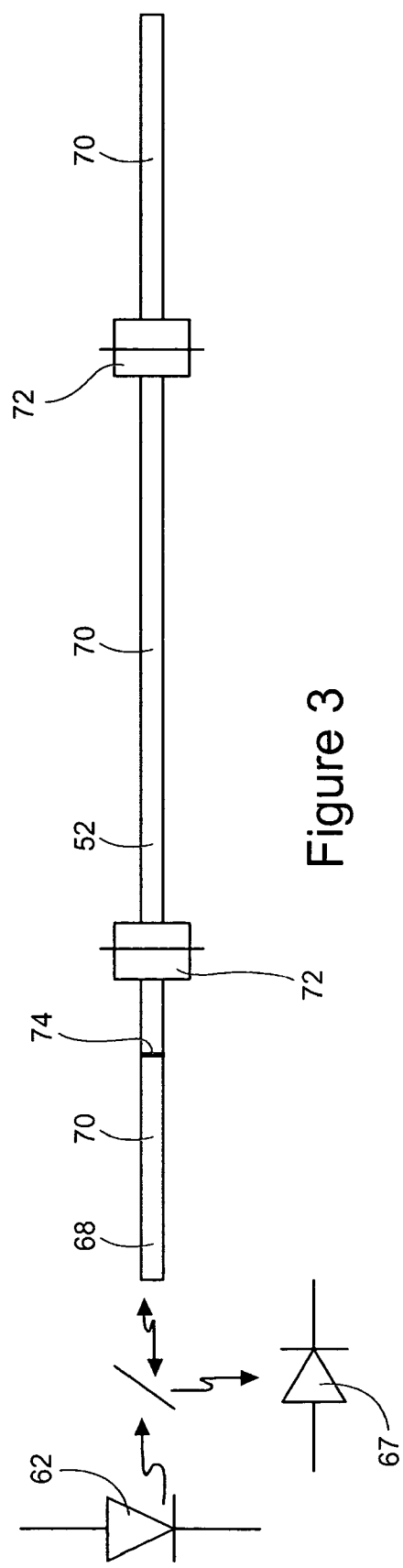
FIG. 3 is a schematic of a light conduit having a damaged fiber optic cable, the light conduit being operatively connected to a laser pulse generator and to a sampling point.
Figure 4:
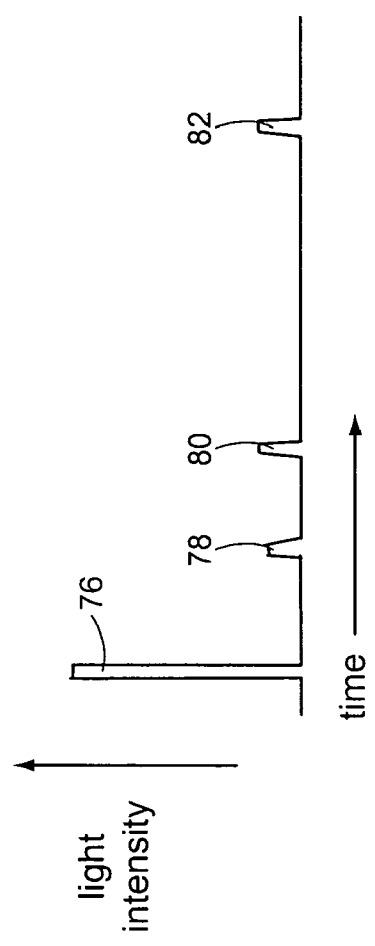
FIG. 4 is a graph of the time domain response of light intensity reaching the sampling point following the emission of a laser pulse along the light conduit represented in FIG. 4.

To understand the method of using the OTDR of the preferred embodiment, an example of a damaged light conduit 68 and the time domain response of a laser pulse emitted thereinto is shown schematically in FIGS. 3 and 4 respectively. The light conduit 68 comprises several fiber optic cables 70 and several connectors 72 joining such cables. Also depicted is a laser pulse generator 62, a sampling point 67, and a damaged portion 74 of one of the fiber optic cables 70. Assuming a laser pulse is generated by the laser pulse generator and travels along the light conduit (from left to right as shown in FIG. 3), the light intensity at the sampling point will vary with time as a result of reflections from the pulse, as shown in FIG. 4. Assuming the position of the sampling point is downstream of the position of laser pulse generator, or coincides therewith, a first spike 76 of light intensity will occur at the sampling point as the laser pulse reaches the sampling point on its way downstream. As the light pulse continues downstream, it eventually encounters the damaged portion of light conduit and is at least partially reflected back upstream, while the remainder of the light pulse continues traveling downstream. This reflected portion of the laser pulse creates a second light intensity spike when it ultimately reaches the sampling point. Likewise, as the laser pulse travels downstream and passes each connector 72, a portion of the laser pulse is reflected thereoff and travels back upstream along the light conduit, eventually reaching the sampling point. This creates yet additional third and fourth light intensity spikes 80,82 at the sampling point. It should be appreciated that, knowing the time between these light intensity spikes, an approximate location of the damaged portion of the fiber optic cable can easily be ascertained relative to the location of the other known points based upon the known speed at which light travels through the light conduit 68. The OTDR of the preferred embodiment allows the time domain of the light intensity spikes to be determined with appreciable accuracy, as is described below.

Figure 5:
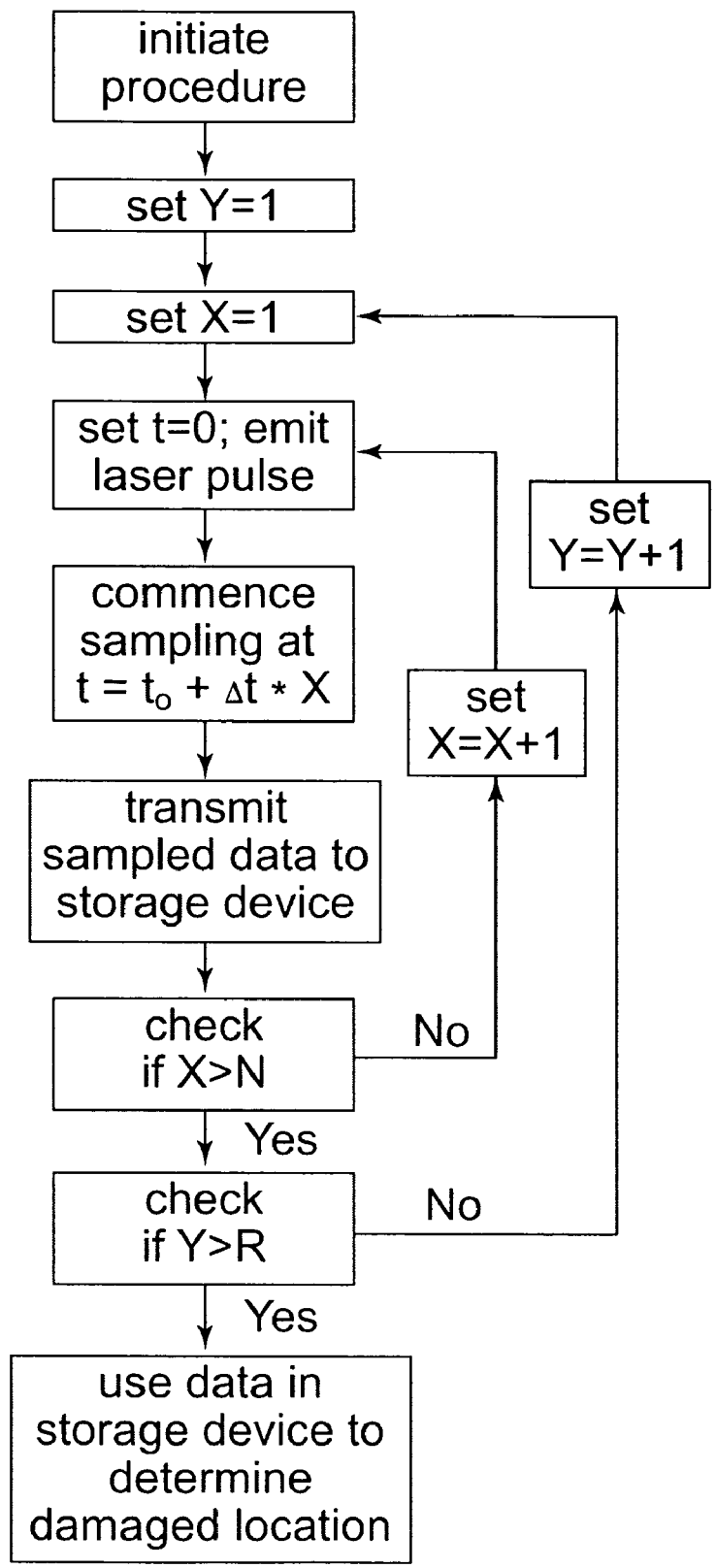
FIG. 5 is a flow-diagram depicting the preferred method of operating the OTDR shown in FIG. 1.

The OTDR is preferably utilized in accordance with the flow-diagram shown in FIG. 5 to determine an approximate location of a damage portion of a light conduit to which the OTDR is operatively connected. The procedure or method generally comprises the emission of a plurality of laser pulses and the compilation and analysis of data obtained from reflections of such laser pulses off of the damaged portion of the fiber optic cable at issue.

The method preferably begins by activating the laser pulse generator to emit a laser pulse that travels in a first direction along the light conduit. The emission of the laser pulse preferably also triggers the variable delay device to begin counting. Initially, the microprocessor instructs the variable delay device to trigger the sample-and-hold device to commence recording data immediately following an initial time period from when the laser pulse was emitted. Thus, after the time delay device determines that such time period has passed, it activates the sample-and-hold device.

Upon activation, the sample-and-hold device records data indicative of light intensity reaching the sampling point over a nanosecond time period. After such sampling is completed, the analog-to-digital converter converts the data into digital format and transmits it to the microprocessor's memory or some other storage device.

As the method continues, a second light pulse is emitted by the laser pulse generator, and the time delay device again begins counting. This time, the microprocessor instructs the variable delay device to trigger the sample-and-hold device to begin recording data immediately after the initial time period plus an incremental time period of one nanosecond has passed. Again, the data is converted and transmitted to the microprocessor's memory. These steps are repeated a number of times (represented as N in the flow-diagram), with the variable delay device being instructed to delay the triggering of the sample-and-hold device a nanosecond longer with each successive iteration.

The number of iterations of the above-mentioned steps performed by the method is dependent upon two main factors. The first factor is the desired accuracy of the approximation of the location of the damaged portion of the fiber optic cable. The second factor is the length of fiber optic cable being examined. For example, assuming that the light conduit is a single glass-fiber optic cable and it is desired to determine the location of any damaged portion thereof along 100 ft of its length to a resolution of three inches, the process will preferably include approximately 400 iterations (4 stages per foot times 100 feet). Additionally, the appropriate delay between stages, is dependent upon the speed that the light travels through the fiber optic cable and the desired resolution. Light travels in glass fibers at about $2 \times 10^8$ meters per second. Thus, if light is to travel three inches then the round trip for the light pulse and its reflection is six inches, which takes the light approximately one nanosecond to travel. Thus, by altering the delay time from one iteration to the next by one nanosecond, the distance to anything causing a reflection should be determinable to within the desired three inches. It should appreciated that the delay time is determined strictly by the desired lineal resolution and is independent of the rate of data transfer being transmitted via the light conduit on other wavelength channels.

It should also be appreciated that, after performing the above mentioned steps, the data transmitted to the microprocessor can be analyzed by the microprocessor in an effort to determine at which iteration, and thus after what particular time delay, a reflection off of the damaged portion of the fiber optic cable reached the sampling point. However, for reasons discussed below, it is preferable to utilize relatively low power laser pulses, and thus additional steps are performed prior to the analysis of the data to improve the accuracy of the data. In particular, as shown in FIG. 5, the process of performing the iterations discussed above are repeated a number of times (represented as R in the flow-diagram) to improve the signal-to-noise ratio of the data. By repeating the iterations (or, alternatively, by performing each iteration a number of times before adjusting the time delay), each sampled time instance will result in data indicative of a composite signal that is "R" times as large as each individual sampled block of data. Thus, the signal-to-noise ratio of the measured response will improve by the square root of R and if, for example, all iterations are repeated 10,000 times, the signal-to-noise ratio is increased by a factor of 100.

Finally, after the iterations and repetitions are performed, the microprocessor then compares the measured time domain response to a previously determined "healthy" time domain response to determine which, if any, reflections are new. In other words, even when undamaged, the time domain response will have spikes resulting from reflection off of various downstream components of the light conduits, such as the connectors. Thus, the comparison facilitates the identification of new spikes that may be the result of a damaged portion of fiber optic cable. After identifying a pertinent spike and the time delay associated therewith, it follows then that the microprocessor can interpolate an approximate distance to the damaged portion that created the spike.

While prior art OTDRs are capable of achieving the same ultimate result, i.e. the determination of an approximate distance to a damaged portion of a fiber optic cable, the OTDR of the preferred embodiment and the method described herein has significant advantages thereover. For example, prior art OTDR devices capable of similar precision require many more components and/or much more expensive components. Moreover, such prior art devices have rather large power consumptions. In contrast, the components associated with the OTDR of the preferred embodiment of the invention, in totality, are very inexpensive and consume minimal power. For example, the circuit of the OTDR of the preferred embodiment imposes no particular timing constraints on the analog-to-digital converter, memory storage device, or microprocessor. As such, an analog-to-digital converter with, say, a one microsecond acquisition time would be suitable. Note that, if this is in fact the analog-to-digital acquisition time, and if the required number of samples along the length of the light conduit were 400, and if the required number of measurement repetitions to attain sufficient signal-to-noise ratios is 10,000, then the entire method can still be performed in only 4 seconds (10,000*400*1 μsec). This is a reasonable measurement of time, considering a channel (wavelength) can be devoted solely to this measurement.

Moreover, the low cost and power consumption of OTDRs in accordance with this invention allows such OTDRs to be installed as an integral part of an optical data transfer assembly where, if desired, they can be continually utilized to monitor the health of such optical data transfer assembly. This is extremely beneficial for military aircraft having fiber optic control systems, be they flight, weapon, or other types of control systems. Such aircraft are frequently operated from locations where prior art external OTDRs are unavailble. Moreover, as discussed above, a baseline or healthy OTDR time domain reflection response must be known in each case in order to compare it to the current OTDR signature. With prior art OTDRs, this would require keeping all OTDR signatures in a database and updated such database whenever maintenance is done on a cable assembly. This is simply too unwieldy for military operations.

However, by providing such aircraft with a plurality of on-board OTDRs that form integral portions of their fiber optic systems, all these drawbacks are eliminated. For example, not only could the condition of a fiber optic system be monitored continuously, but each OTDR could automatically reset the baseline time domain response after maintenance or other alteration to the fiber optic assembly is made. The invention undoubtedly provides similar advantages to the fiber optic systems of other land-based vehicles and even stationary communication systems.

While the present invention has been described in reference to a specific embodiment, in light of the foregoing, it should be understood that all matter contained in the above description or shown in the accompanying drawings is intended to be interpreted as illustrative and not in a limiting sense, and that various modifications and variations of the invention may be constructed without departing from the scope of the invention defined by the following claims. For example, a "damaged portion" of a fiber optic cable could be, but is certainly not limited to, a disconnected coupler, a complete sever of the cable, or merely a scratch extending through the outer glass cladding of the fiber optic cable and just slightly into its inner glass core that doesn't even appreciably diminish data transfer. Moreover, it is not necessary that the delay device be adjusted or incremented in any systematic manner. Yet further, the delay device could be operatively connected to the laser pulse generator through the microprocessor, and the microprocessor configured to trigger both the delay device and the laser pulse generator simultaneously. Thus, other variations and modifications should also be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the limited elements. Similarly, the term "portion" should be construed as meaning some or all of the item or element that it qualifies.

What is claimed is:

1. A method comprising:
    providing a light conduit, the light conduit being comprised of at least one fiber optic cable, the fiber optic cable having at least one damaged portion;
    providing a sample-and-hold device, the sample-and-hold device being adapted and configured to store information indicative of light intensity reaching a sampling point;
    providing a storage device, the storage device being operatively connected to the sample-and-hold device in a manner such that information stored by the sample-and-hold device can be transmitted to and stored by the storage device;
    iteratively performing the following steps a) through c) N number of times, wherein N is greater than two and X is a number that is adjusted after each iteration;
    a) transmitting a laser pulse in a first direction along the light conduit in manner such that at least a portion of the laser pulse is reflected by the damaged portion of the fiber optic cable back along the light conduit in a direction opposite the first direction and eventually reaches the sampling point;
    b) storing a block of information indicative of light intensity reaching the sampling point throughout a period of time via the sample-and-hold device, the storing of the block of information commencing the sum of a first period of time and a second period of time from when the portion of the laser pulse is reflected by the damaged portion of the fiber optic cable, the second period of time being equal to the product of X and an incremental time interval;
    c) storing the block of information via the storage device;
    determining an approximate location of the damaged portion of the fiber optic cable along the light conduit via the information stored by the storage device.

2. A method in accordance with claim 1 further comprising the step of providing a variable delay device, the variable delay device being operatively connected to the sample-and-hold device, each iterative step of storing the block of information via the sample-and-hold device further comprising initiating the commencing of the storing of the block of information in response to a signal provided by the variable delay device.

3. A method in accordance with claim 1 further comprising the step of repeating the step of iteratively performing steps a) through c) at least one hundred times.

4. A method in accordance with claim 1 further comprising providing a vehicle in a manner such that the vehicle has a control system that comprises the light conduit and the sample-and-hold device.

5. A method in accordance with claim 4 wherein the vehicle provided is an aircraft.

6. A method in accordance with claim 1 wherein the incremental time interval is at most one nanosecond.

7. A method in accordance with claim 1 further comprising providing an analog to digital converter that is operatively connected to the sample-and-hold device and to the storage device, and wherein each iterative step of storing the block of information via the sample-and-hold device comprises storing the block of information via the sample and-hold device in an analog manner, and wherein each iterative step of storing the block of information via the storage device comprises converting the block of information from analog to digital via the analog to digital converter and digitally storing the block of information via the storage device.

8. A method in accordance with claim 1 wherein the step of iteratively performing steps a) through c) is performed in a manner such that each iteration of steps a) through c) is separated from the next iteration by a period of time that is at least one-thousand times greater than the incremental time interval recited in the step of storing the block of information via the sample-and-hold device.

9. A method comprising:
    providing a vehicle in a manner such that the vehicle comprises a control system, an on-board optical time domain reflectometer, and a light conduit, the control system comprises at least one fiber optic cable, the on-board optical time domain reflectometer being operatively connected to the fiber optic cable, the light conduit being comprised of the fiber optic cable, the on board optical time domain reflectometer comprising a sample-and-hold device and a storage device, the sample-and-hold device being adapted and configured to store information indicative of light intensity reaching a sampling point, the storage device being operatively connected to the sample-and-hold device in a manner such that information stored by the sample-and-hold device can be transmitted to and stored by the storage device; and
    using the on-board optical time domain reflectometer to locate an approximate position of a damaged portion of the fiber optic cable to within twelve inches relative to another portion of the vehicle by iteratively performing the following steps a) through c) N number of times, wherein N is greater than two and X is a whole number that increases by one after each iteration;

a) transmitting a laser pulse in a first direction along the light conduit in a manner such that at least a portion of the laser pulse is reflected by the damaged portion of the fiber optic cable back along the light conduit in a direction opposite the first direction and eventually reaches the sampling point;

b) storing a block of information indicative of light intensity reaching the sampling point throughout a period of time via the sample-and-hold device, the storing of the block of information commencing the sum of a first period of time and a second period of time from when the portion of the laser pulse is reflected by the damaged portion of the fiber optic cable, the second period of time being equal to the product of X and an incremental time interval;

c) transmitting the block of information to the storage device and storing the block of information via the storage device.

10. A method in accordance with claim 9 wherein the step of providing the vehicle occurs in a manner such that the on board optical time domain reflectometer comprises a variable delay device, the variable delay device being operatively connected to the sample-and-hold device, each iterative step of storing the block of information via the sample-and-hold device further comprising initiating the commencing of the storing of the block of information in response to a signal provided by the variable delay device.

11. A method in accordance with claim 9 wherein the incremental time interval is at most one nanosecond.

12. A method in accordance with claim 9 wherein the step of iteratively performing steps a) through c) is performed in a manner such that each iteration of steps a) through c) is separated from the next iteration by a period of time that is at least one-thousand times greater than the incremental time interval recited in the step of storing the block of information via the sample-and-hold device.

13. An assembly comprising:

a light conduit, the light conduit having at least one light reflective portion;

a light source, the light source being operatively connected to the light conduit and being adapted and configured to transmit a pulse of light along the light conduit;

a sample-and-hold device, the sample-and-hold device being operatively connected to the light conduit and being adapted and configured to store information indicative of light intensity reaching a sampling point;

a storage device, the storage device being operatively connected to the sample-and-hold device in a manner such that information stored by the sample-and-hold device can be transmitted to and stored by the storage device; and a microprocessor, the microprocessor being operatively connected to the storage device;

the assembly being configured and adapted to iteratively perform the following steps a) through c) N number of times, wherein N is greater than two and X is a number that is adjusted after each iteration: a) transmitting a light pulse in a first direction along the light conduit in manner such that at least a portion of the light pulse is reflected by the light reflective portion of the light conduit back along the light conduit in a direction opposite the first direction and eventually reaches the sampling point; b) storing a block of information indicative of light intensity reaching the sampling point throughout a period of time via the sample-and-hold device, the storing of the block of information commencing the sum of a first period of time and a second period of time from when the portion of the light pulse is reflected by the light reflective portion of the light conduit, the second period of time being equal to the product of X and an incremental time interval; and c) storing the block of information via the storage device;

the microprocessor being adapted and configured to determine an approximate location of the light reflective portion of the light conduit along the light conduit via the information stored by the storage device.

* * * * *

UNITED STATES PATENT AND TRADEMARK OFFICE
CERTIFICATE OF CORRECTION

PATENT NO. : 7,095,493 B2  
APPLICATION NO. : 10/722688  
DATED : August 22, 2006  
INVENTOR(S) : Daniel N. Harres Page 1 of 1

It is certified that error appears in the above-identified patent and that said Letters Patent is hereby corrected as shown below:

Column 1, Line 9: - "N00019-04-0005" should be --N00019-04-C-0005--

Signed and Sealed this
Twelfth Day of March, 2013

Teresa Stanek Rea
*Acting Director of the United States Patent and Trademark Office*